(12) United States Patent
Karkheck

(10) Patent No.: US 10,812,012 B2
(45) Date of Patent: Oct. 20, 2020

(54) HINGING INVERTED SEAM MODULE MOUNTING SYSTEM

(71) Applicant: Tesla, Inc., Palo Alto, CA (US)

(72) Inventor: Johann Fritz Karkheck, Petaluma, CA (US)

(73) Assignee: Tesla, Inc., Palo Alto, CA (US)

( * ) Notice: Subject to any disclaimer, the term of this patent is extended or adjusted under 35 U.S.C. 154(b) by 18 days.

(21) Appl. No.: 15/909,542

(22) Filed: Mar. 1, 2018

(65) Prior Publication Data
US 2019/0273461 A1 Sep. 5, 2019

(51) Int. Cl.
| H02S 30/20 | (2014.01) |
| H02S 20/25 | (2014.01) |
| H02S 10/40 | (2014.01) |
| F24S 25/634 | (2018.01) |
| F24S 30/425 | (2018.01) |
| F24S 25/60 | (2018.01) |

(52) U.S. Cl.
CPC ............ H02S 20/25 (2014.12); F24S 25/634 (2018.05); F24S 30/425 (2018.05); *F24S 2025/6004* (2018.05); *H02S 30/20* (2014.12)

(58) Field of Classification Search
CPC .. F24J 2/2539; F24J 2/5262; F24J 2002/5277; H01L 31/02013; H02S 30/10; H02S 30/20; H02S 40/36; H02S 10/40
See application file for complete search history.

(56) References Cited

U.S. PATENT DOCUMENTS

| 5,732,765 A * | 3/1998 | Drolen | B64G 1/50 165/41 |
| 5,785,280 A * | 7/1998 | Baghdasarian | B64G 1/222 136/245 |
| 6,532,985 B1 * | 3/2003 | Griffin | E03B 7/077 137/341 |
| 8,440,950 B1 * | 5/2013 | Reischmann | F24S 30/425 250/203.4 |
| 10,036,577 B2 * | 7/2018 | Mascolo | H02S 20/00 |
| 2009/0320898 A1 * | 12/2009 | Gumm | H02S 30/20 136/245 |
| 2011/0253193 A1 * | 10/2011 | Korman | H01L 31/048 136/245 |
| 2013/0186450 A1 * | 7/2013 | Smith | H02J 7/0052 136/245 |
| 2013/0219812 A1 * | 8/2013 | Goodman | E04G 21/14 52/173.3 |
| 2014/0048498 A1 * | 2/2014 | Kuan | H02S 30/10 211/41.1 |
| 2015/0059381 A1 * | 3/2015 | Hoffmann | H02S 20/30 62/235.1 |
| 2015/0101996 A1 * | 4/2015 | Nayar | F24S 25/16 211/41.1 |

(Continued)

*Primary Examiner* — Phi D A
(74) *Attorney, Agent, or Firm* — Dentons US LLP

(57) ABSTRACT

Building integrated photovoltaic (BIPV) systems provide for solar panel arrays that can be aesthetically pleasing to an observer. BIPV systems can be incorporated as part of roof surfaces as built into the structure of the roof, particularly as photovoltaic tiles. Each photovoltaic module may comprise a photovoltaic laminate, a support arm and a mounting bracket. When installed an assembly of the photovoltaic laminate and support arm are rotatably attached to the mounting bracket allowing access under the array of photovoltaic modules.

20 Claims, 12 Drawing Sheets

(56) References Cited

U.S. PATENT DOCUMENTS

| | | | |
|---|---|---|---|
| 2015/0179848 A1* | 6/2015 | Korman | H02S 30/20 |
| | | | 136/245 |
| 2015/0205095 A1* | 7/2015 | Hahn | G02B 7/183 |
| | | | 359/846 |
| 2016/0010886 A1* | 1/2016 | Dukes | F24F 7/025 |
| | | | 454/343 |
| 2016/0261227 A1* | 9/2016 | Wares | H02S 30/10 |
| 2018/0278201 A1* | 9/2018 | Tehan | H02S 30/20 |

\* cited by examiner

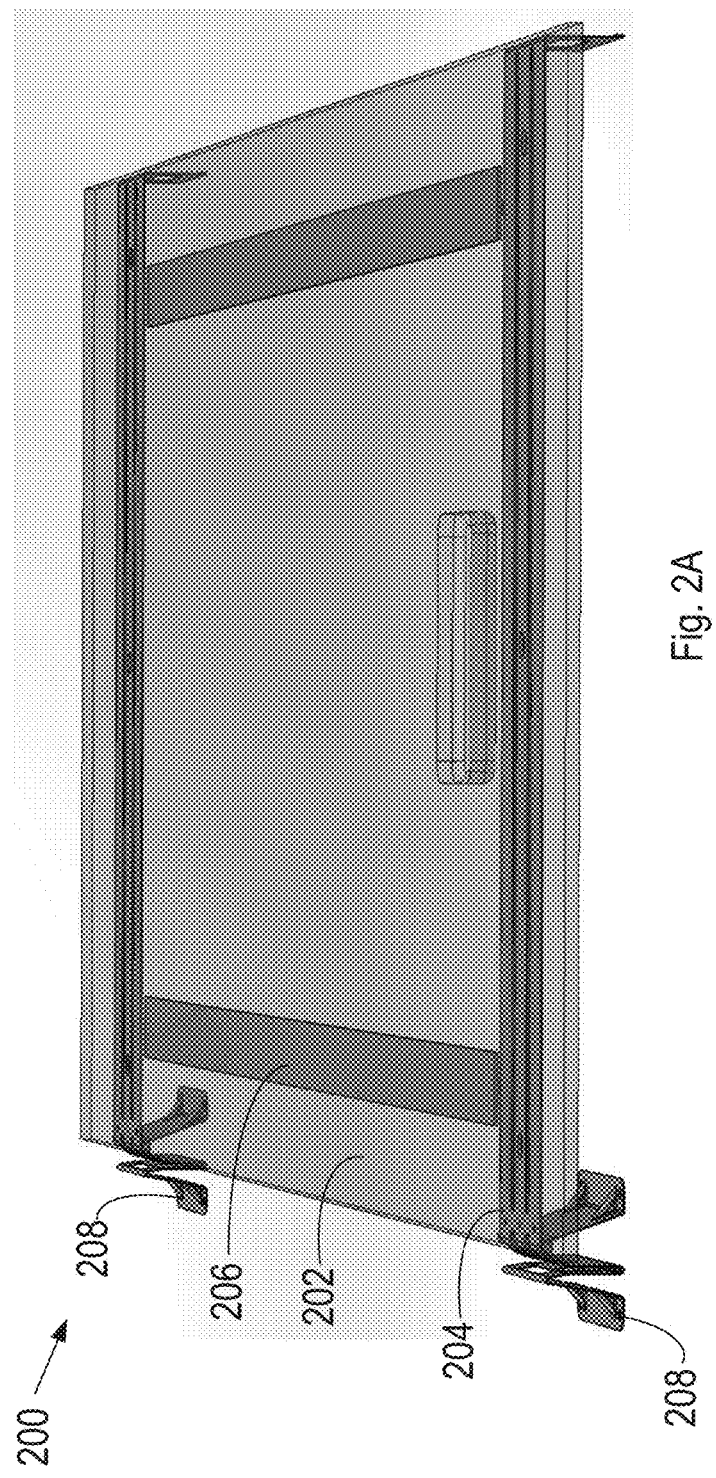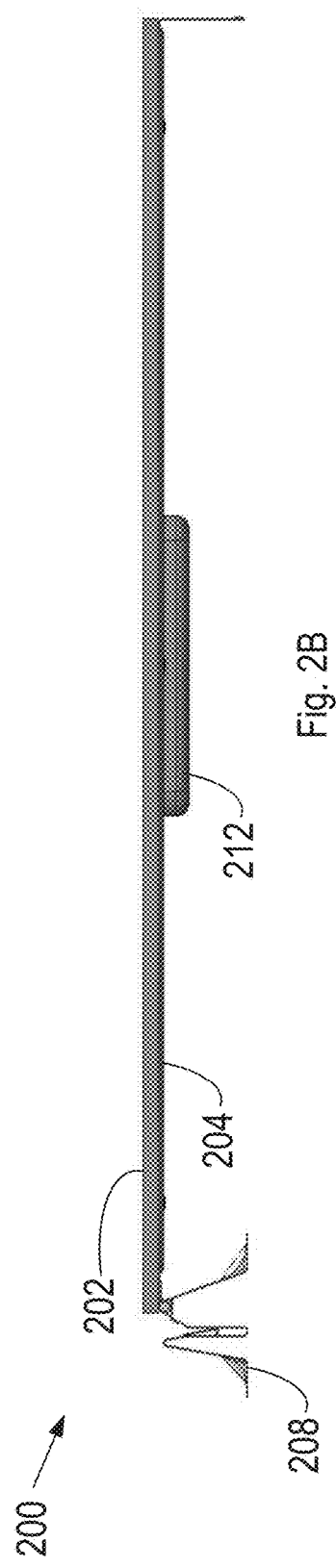

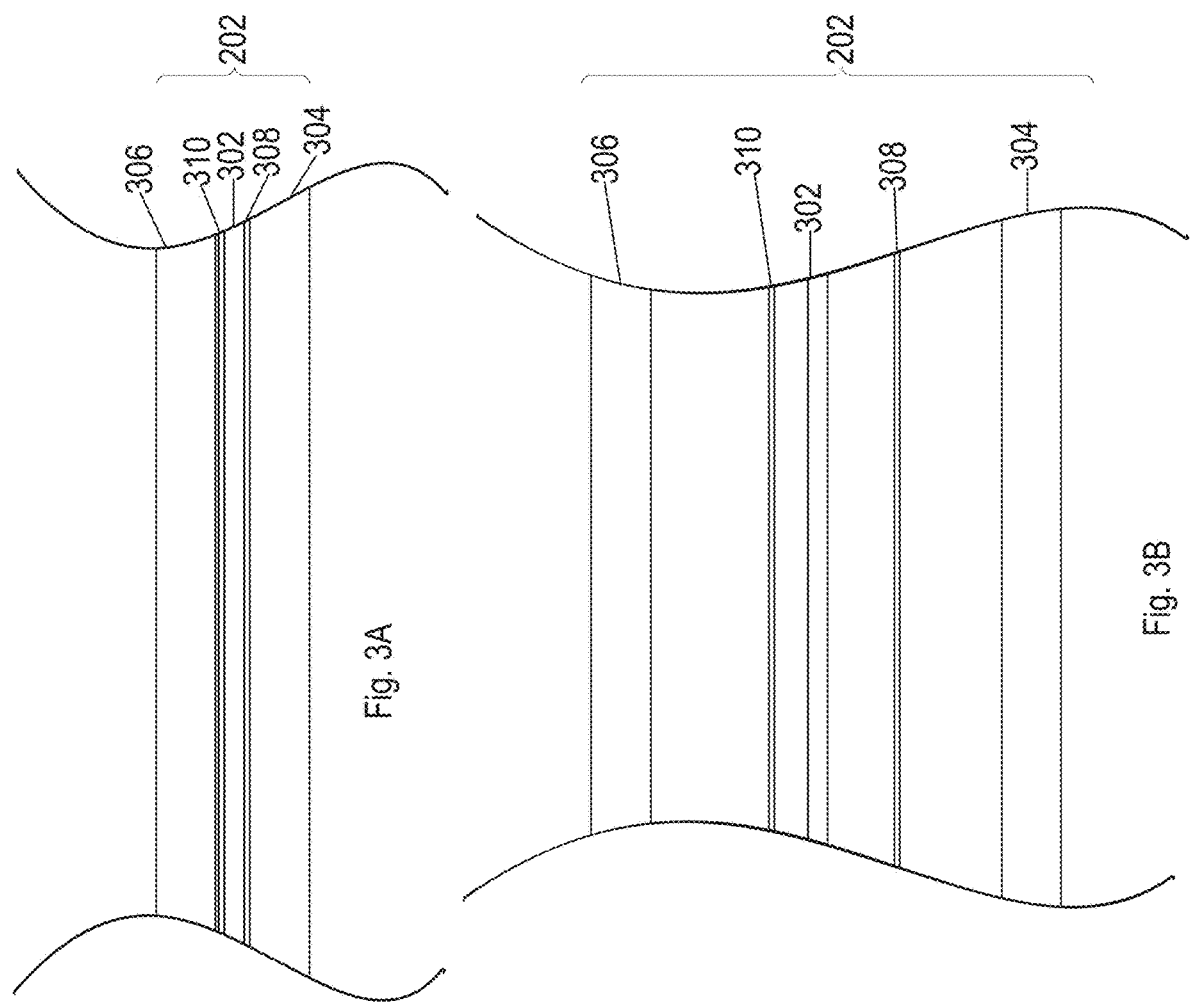

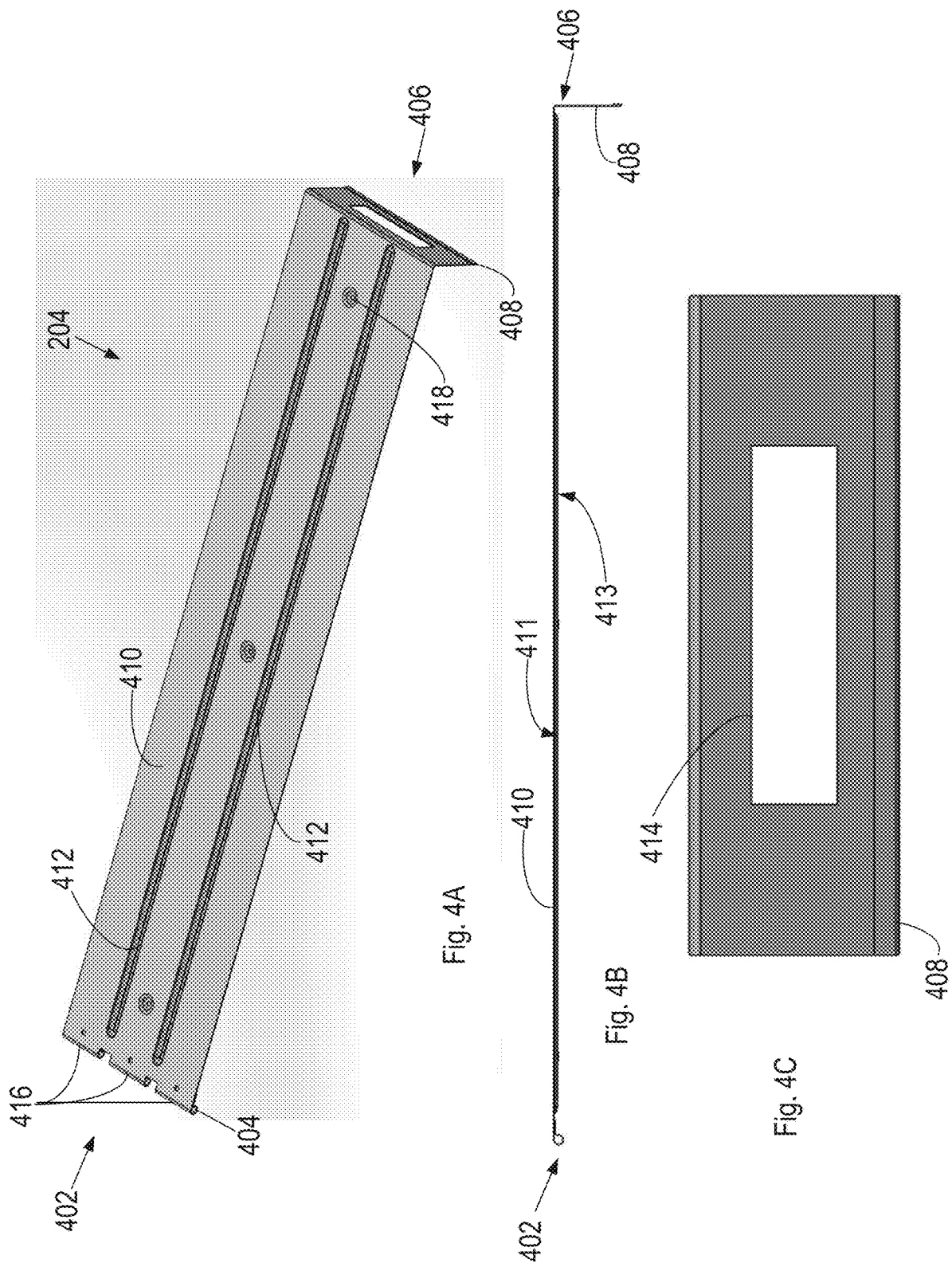

HINGING INVERTED SEAM MODULE MOUNTING SYSTEM

TECHNICAL FIELD

This generally relates to photovoltaic arrays.

BACKGROUND

Solar is becoming increasingly popular in the United States and abroad, but penetration remains relatively low versus the number of homes that could benefit from solar. The price per kilowatt-hour for solar is now competitive with or below that of fossil fuel based utility power in most areas, however, solar largely remains a niche product for those who value saving money, reducing $CO_2$ emissions, and/or people living off the grid.

One factor that may limit the adoption of solar technology is aesthetics. Most residential solar systems are installed as rectangular framed photovoltaic (PV) modules positioned above an existing tile or composite shingle roof. The solar array often only covers a portion of the roof and therefore stands out both in height and material as separate and distinct from the underlying existing roof. This structure is visible even from the street level and over large distances.

Another obstacle to solar adoption in existing homes is the dissonance between the age of the existing roof and the lifespan of a solar system, particularly where the existing roof is made from composite shingles. The expected life of a solar system is at least 25 years, and the expected life of a composite shingle roof ranges from 20 to 50 years, depending on the local climate and quality of materials. At the time a customer is considering going solar, their existing roof may have less remaining lifespan than the expected lifespan of a solar system. So when deciding to go solar, the customer may be presented with the dilemma of having to get a new roof in addition to the solar system, which dramatically increases the cost of going solar.

Accordingly, there is a need to resolve the dissonance between the expected life of the solar system and the remaining life of the roof, that also blends in aesthetically with the complete roof surface, and that does not require the prospective customer to pay for a new roof and a new solar system over that roof.

BRIEF SUMMARY

Various embodiments provide a new and improved approach to installing solar as a roofing surface. Some aspects are installed over existing roof structures (e.g., a metal roof, composite shingle, roof deck, underlayment or insulation layer). Some aspects have improved aesthetics that reduce the visual differences between solar and non-solar portions of the roof. In addition, some aspects cost less to make and install compared to conventional solar systems. In addition, some aspects allow for easy access to wiring and the underlying roof structure compared to conventional solar systems These and other embodiments are discussed in greater detail in the detailed description and drawing figures.

BRIEF DESCRIPTION OF THE DRAWINGS

Illustrative aspects of the present disclosure are described in detail below with reference to the following drawing figures. It is intended that that embodiments and figures disclosed herein are to be considered illustrative rather than restrictive

FIG. 2A shows a perspective view of a PV module, in accordance with embodiments of the disclosure.

FIG. 2B shows a side view of the PV module of FIG. 2A.

FIGS. 3A and 3B show a side view and an exploded side view of a PV laminate, in accordance with embodiments of the disclosure.

FIG. 4A shows a perspective view of a support arm, in accordance with embodiments of the disclosure.

FIG. 4B shows a side view of the support arm of FIG. 4A.

FIG. 4C shows a tongue side end view of the support arm of FIG. 4A.

DETAILED DESCRIPTION

Figure 1A:
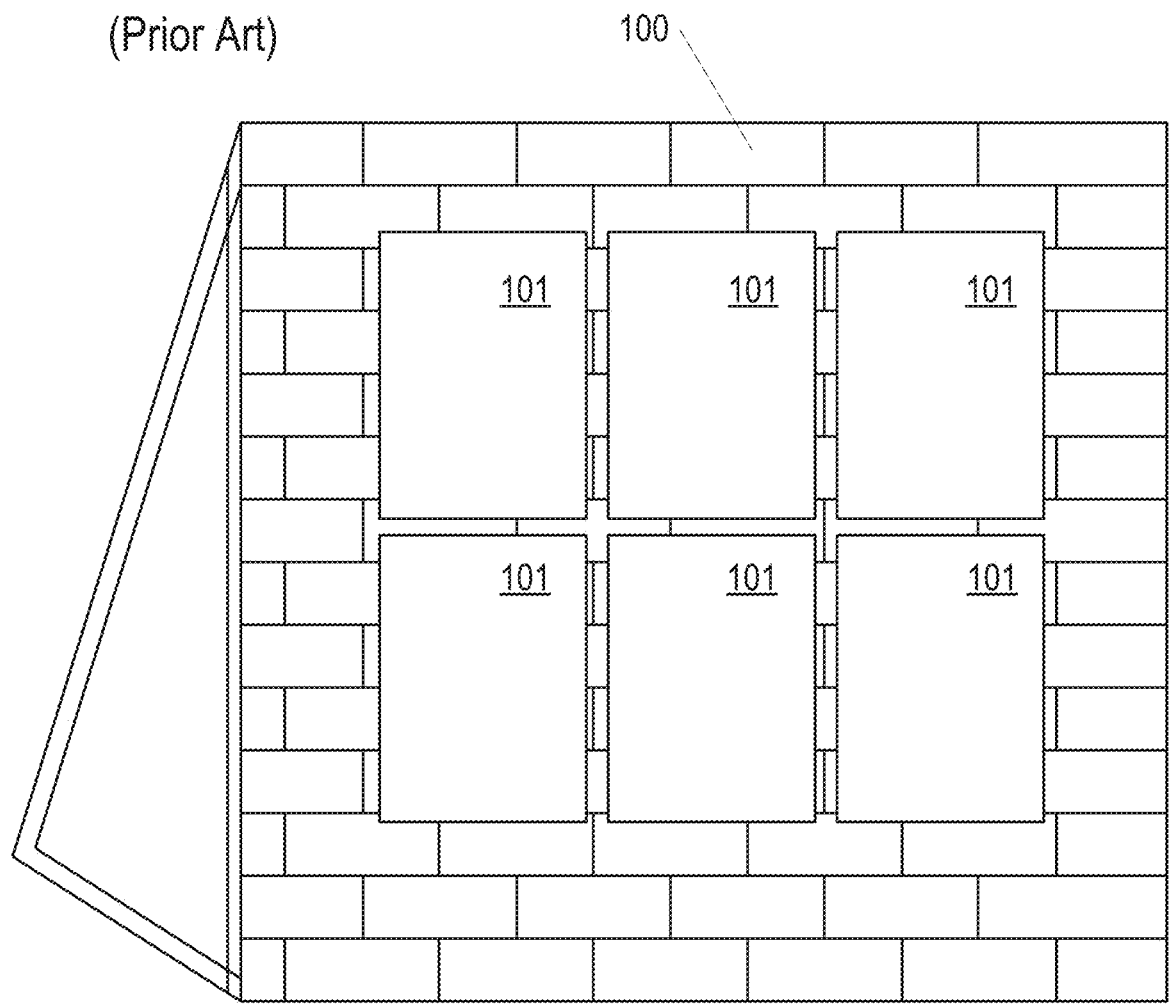
FIG. 1A shows an example of a prior art photovoltaic array installed on a roof.

The present disclosure describes various embodiments of photovoltaic roofing systems and associated systems and methods. Some embodiments relate to building integrated photovoltaic module assemblies and associated systems and methods. In various embodiments, the systems described herein eliminate the inherent redundancy involved with conventional solar while providing improved aesthetic for a PV roof system, and particularly a building integrated PV system.

Certain details are set forth in the following description and in the figures to provide a thorough understanding of various embodiments of the present technology. Other details describing well-known structures and systems often associated with PV systems and roofs are not set forth below to avoid unnecessarily obscuring the description of the various embodiments of the present technology.

Many of the details, dimensions, angles and other features shown in the figures are merely illustrative of particular embodiments. Accordingly, other embodiments can include other details, dimensions, angles and features without departing from the spirit or scope of the present invention. Various embodiments of the present technology can also include structures other than those shown in the figures and are expressly not limited to the structures shown in the figures. Moreover, the various elements and features shown in the figures may not be drawn to scale. In the figures, identical reference numbers identify identical or at least generally similar elements.

As used herein, the term "substantially" refers to the complete or nearly complete extent or degree of an action, characteristic, property, state, structure, item, or result. For example, an object that is "substantially" uniform in height to another object would mean that the objects are either completely or nearly completely uniform in height. The exact allowable degree of deviation from absolute completeness may in some cases depend on the specific context, however, generally speaking, the nearness of completion will be so as to have the same overall result as if absolute and total completion were obtained.

As used herein, the term "about" is used to provide flexibility to a numerical range endpoint by providing that a given value may be "above" or "below" the value. For example, the given value modified by about may be, for example, by ±5%, ±10%, ±15%, ±20%.

Wherever used throughout the disclosure and claims, the term "generally" has the meaning of "approximately" or "closely" or "within the vicinity or range of". The term "generally" as used herein is not intended as a vague or imprecise expansion on the term it is selected to modify, but rather as a clarification and potential stop gap directed at those who wish to otherwise practice the appended claims, but seek to avoid them by insignificant, or immaterial or small variations. All such insignificant, or immaterial or small variations should be covered as part of the appended claims by use of the term "generally".

As used herein, the term "building integrated photovoltaic system" or "BIPV" generally refers to photovoltaic systems integrated with building materials to form at least a portion of a building envelope. For example, the BIPV system can form the roof or roofing membrane of a building. The BIPV systems described herein can be retrofitted, can be a part of a new construction roof, or a combination of both. Such building integrated photovoltaic structures can be alternatively referred to as building integrable photovoltaic ("BIP") or building applied photovoltaics ("BAPV"). Components of a BIPV system used, in part, as the actual building envelope (e.g., roofing membrane), can provide a watertight or substantially watertight seal for the roof surface.

As used herein, the terms "up-roof", "down-roof", "side-roof", "left-roof" and "right-roof" are used to provide orientation, direction, position, or a reference point relative to or in context of a roof or roofing surface upon which the systems described herein are installed on and/or form a portion of Up-roof generally refers to an orientation that is relatively closer to the roof ridge while down-roof refers to an orientation that is relatively closer to the roof eave. Side-ride, left-roof and right-roof generally refers to an orientation that is relatively equidistance to the roof ridge and in line horizontally from the reference element. Embodiments herein may disclose features being on a left or right side of a PV module, or PV array. It is understood that all embodiments may be made as left/right mirror images of themselves and installation can be performed in left/right mirror orientation.

As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as shown in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below, depending on the context of its use. The device may be otherwise oriented (rotated 90 degrees or at other orientations) and the spatially relative descriptors used herein are interpreted accordingly.

Although the terms "first", "second", etc. may be used herein to describe various elements, components, regions, layers and/or sections, it should be understood that the terms do not connote the number or order of the elements. These terms are used to distinguish one element, component, region, layer, or section from another. Thus, a first element, component, region, layer, or section discussed below could be termed a second element, component, region, layer, or section without departing from the teachings of the present invention.

As used herein, the terms "and/or" and "at least one of" include any and all combinations of one or more of the associated listed items.

Referring now to the drawing figures, in contrast with embodiments of the present disclosure, FIG. 1A shows a prior art PV array installed on roof 100. The exemplary prior art PV array of FIG. 1A includes six framed PV modules 101, which though not shown in detail may be mounted on roof 100 using one of various known rail-based or rail-free mounting systems, as are currently employed by solar installers.

Figure 1B:
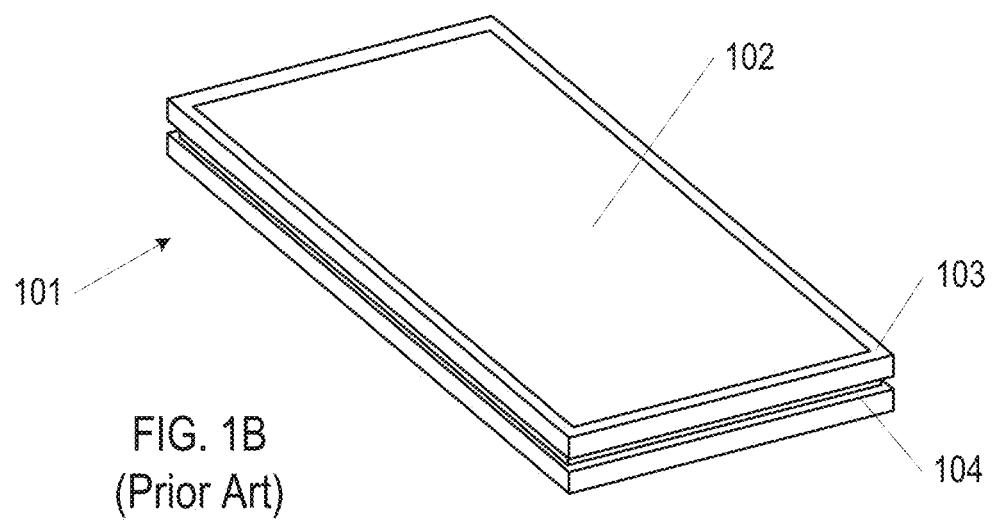
FIG. 1B shows an exemplary prior art photovoltaic module.

FIG. 1B shows one type of conventional PV module 101 in more detail. PV module panel 101 includes glass-on-glass PV laminate 102, which in conventional silicon-based cells, consists of a silicon sandwich of p-doped and n-doped silicon layers, a top glass sheet and a back glass sheet protecting the silicon-based cells, and rigid metal frame 103 around the perimeter providing structural support for laminate 102 and providing mounting points for PV module 101. Although shown as a unitary structure, laminate 102 may include a plurality of individual solar cells that are wired together to form a single unit between the sheets of glass. In the example shown in FIG. 1B, frame 103 is a grooved frame with groove 104 circumscribing the outer face of frame 103 on all sides. In such a module, groove 104 serves as mechanism for attaching mounting hardware to join modules together and to support the modules over a roof surface. Those of ordinary skill in the art will appreciate that PV module 101 may also have a plain, non-grooved frame. Non-grooved frames are typically interconnected to one another and connected to the roof using connectors that clamp down between the top and bottom edges of the rigid frame.

Although these types of framed PV modules achieve their structural function, they are aesthetically suboptimal and have material usage inefficiencies relative to BIPV roofing systems. First, conventional PV systems, such as that shown in FIG. 1A, are typically installed over an existing roof, and not as part of the existing roof, essentially requiring redundant structures since the PV array will shield most of the portion of the roof that it is installed over from the elements. Second, conventional systems are deemed by some people to be unappealing, having a choppy, discontinuous, and/or extraneous aesthetic. Third, conventional systems may include electronics, e.g. wiring and junction boxes, under the PV modules that are difficult to access without removing one or more PV modules from the array.

Further, conventional PV modules usually come in one of two colors: blue, signifying a poly-crystalline silicon structure, and black, signifying a mono-crystalline silicon or thin-film structure. Regardless of whether blue or black modules are used, the difference between the look of the portion of the roof that is covered with solar panels and the remainder of the roof is generally quite dramatic. This contrast can be particularly jarring with a conventional PV system and array mounted on a tile roof. As a result, roofs that are only partially covered with solar panels have an aesthetic contrast that can be seen from very far distances due to the difference in reflectivity, elevation, height, and/or color between these two very different surfaces.

The technology disclosed herein includes PV modules including a hinged mounting bracket that allows the PV laminate portion of the PV module to rotate away from the underlying roof structure in order to uncover and give access to the underlying roof structure. The PV modules can be electrically connected together and secured on an underlying roof structure so that they make up the main surface of the roof, and in particular, a roof visually appearing to have a flat consistent surface. Roof surfaces formed of PV modules as disclosed herein may be directly affixed to the framing structure of a roof and can be lighter than traditional on-roof arrays, at least because built-in solar arrays do not have heavy frames and related heavy frame support structures affixed above an existing roof. The PV laminates of each PV module may be electrically connected in strings or other circuits located on an underside of an array of PV modules that is visually appealing at least in that wiring is hidden from view.

PV modules as disclosed herein may be mounted by securing and sealing underlayment or other sheathing to frame elements of the underlying roof structure, installing PV modules to form the main surface of the roof, working around obstacles (e.g., chimneys, skylights, vents, etc.) as needed, and installing flashing or other trim structures of the roof. The PV modules may have a structural integrity capable of accommodating and supporting the PV cells encapsulated in the PV modules, in terms of weight, heat generated, ability to connect electronics, and retaining strength to serve as a portion of a roof surface. Further, the PV modules used for systems considered herein can have a wide range of colors to have a similar appearance to traditional non-PV roofing, including, but not limited to, blue, blacks, grays, browns, and natural clay colorations.

FIG. 2A shows exemplary PV module 200 for use with the BIPV technology disclosed herein. PV module 200 includes PV laminate 202, support arms 204, and mounting brackets 208. As shown in FIG. 2A, in embodiments PV module 200 includes two mounting brackets, however in embodiments PV modules may include any number of mounting brackets, including one. As shown, PV laminate 202 is adhered to support arms 204. In embodiments, the length of support arms 204 substantially matches the width of PV laminate 202. The assembly including PV laminate 202 and support arms 204 is rotatably connected to mounting brackets 208. With mounting brackets 208 secured to an underlying roof structure, the rotation allows the assembly including PV laminate 202 and support arms 204 to rotate relative to the underlying roof structure while also being secured to the underlying roof structure. In embodiments, PV module 200 may further include support braces 206 and electrical component box 212. Electrical component housing 212 may house module level electrical distribution components, for example junction boxes, micro-inverters, and DC optimizers. As will be discussed below, when PV modules 200 are installed as a roof surface, electrical component housing 212 will be hidden from view, but accessible, along with other electrical cabling below PV module 200, by rotating PV laminate assemblies to a propped up configuration.

Figure 2C:
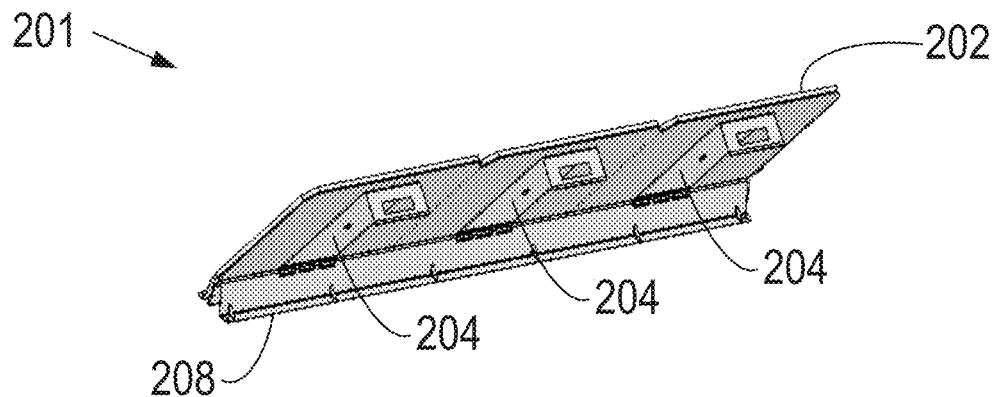
FIGS. 2C and 2D show perspective views of a PV module, in accordance with embodiments of the disclosure.
Figure 2D:
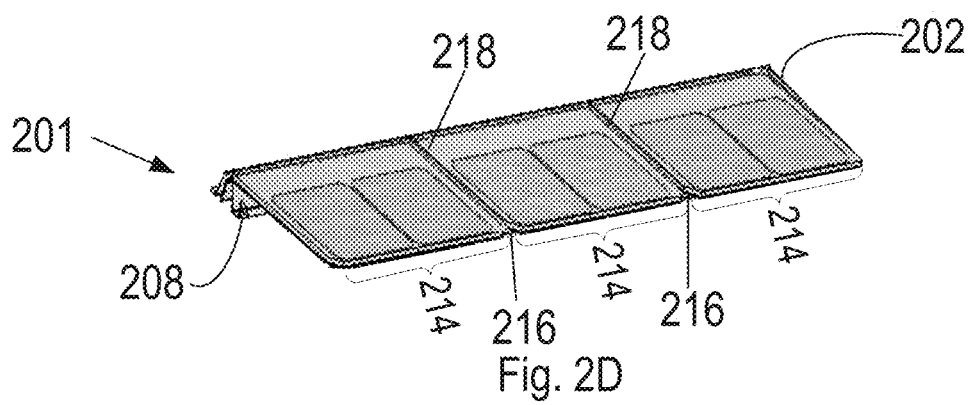
Figure 2E:
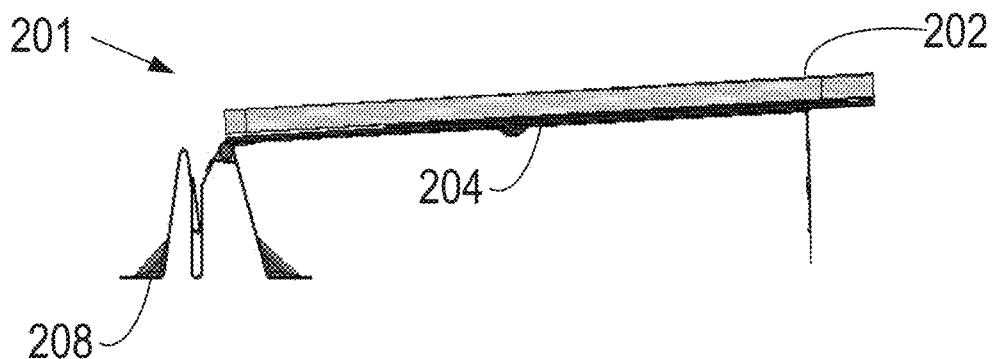
FIG. 2E shows a side view of the PV module of FIG. 2C.

FIGS. 2C-2E show PV module 201 similar to PV module 200. PV module 201 includes PV laminate 202, support arms 204, and mounting bracket 208. As shown, PV laminate 202 is adhered to three support arms 204. In embodiments, any number of support arms may extend from one or more mounting brackets of a PV module and be adhered to one or PV laminates of the PV module. In embodiments, the length of support arms 204 is shorter than the length of PV laminate 202 and a portion of PV laminate 202 extends beyond the end of support 204, as shown in FIG. 2C. The portion of PV laminate 202 extending beyond support arms 204 may be referred to as an overlap portion and be used to overlap an adjacent PV module, for example a down-roof PV module in a shingled configuration, as will be discussed in greater detail below regarding FIGS. 9A and 9B.

As shown for example in FIGS. 2C and 2D, in embodiments PV laminate 202 may comprise individual tile portions 214. Each tile portion 214 have the visual appearance of a distinct tile. As shown in FIGS. 2C and 2D, in embodiments, PV laminate 202 comprises three tile portions 214, however in embodiments, PV laminate may include any integer values, or fraction thereof, tile portions. Each tile portion may be substantially the same size, or tile portions may have different sizes, and the size of each tile portion may depend on the desired aesthetics of the resulting tile roof. Elements of PV laminate 202 may include aesthetic features to distinguish adjacent tile portions 214. For example, as shown in FIG. 2D, the lower edge of PV laminate 202 may include notches 216 between each tile portion 214 and visually noticeable edges 218 between each tile portion 214.

As shown in FIGS. 2A and 2B PV laminate 202 is depicted as a unitary translucent element for clarity purposes, however PV laminate 202 may include multiple layers including one or more PV cells 302, laminated between inner sheet 304 and outer sheet 306 with encapsulation layers 308 and 310, as shown in cross-section view and exploded cross-section view of FIGS. 3A and 3B. PV 202 laminate may be substantially frameless, in that the edges are free of elements that provide structural support, for example no metal frame is present. Structural support for PV laminate 202 may be provided by a combination of one or more of inner sheet 304, outer sheet 306, support arms 204 and support braces 206.

Outer sheet 306 forms an outer layer of PV laminate 202 and is adhered to PV cells 302 with encapsulation layer 310. Outer sheet 306 is light transmissive and may be substantially transparent and further is configured to allow solar energy to reach PV cells 302. Outer sheet 306 may be made of glass or transparent plastic. Outer sheet 306 may have the dimensions of 220 mm by 356 mm by 5 mm. Inner sheet 304 may have substantially the same dimensions as outer sheet 306. In embodiments, outer sheets and inner sheets may have the same thickness and/or be made of the same material. In embodiments, outer sheets and inner sheets may have different thicknesses and/or be made of different materials. For example, the thickness and material of outer sheets may be selected for light transmissivity properties and/or aesthetic properties and the thickness and material of inner sheets may be selected for structural, fire prevention related properties, and properties related to adhering to support arms 204.

PV cell 302 can include multiple layers including solar energy collecting layers, semiconductor layers, bussing, and insulation sandwiched between encapsulation layers 308 and 310 when assembled in PV laminate 202. Encapsulation layers 308 and 310 may be for example ethylene-vinyl acetate (EVA). In embodiments, PV cells 216 are crystalline-based that can be either or both of monocrystalline or polycrystalline (multi-crystalline). In embodiments, PV cells 302 may comprise thin-film PV materials, such as cadmium telluride, copper-indium-gallium-diselenide ("CIGS"), or amorphous thin-film silicon. Further, in embodiments PV cells 302 may comprise perovskite or other currently known but not yet commercialized materials. The particular type of PV cell technology used for any given installation can be selected both for solar energy collecting functionality and for aesthetic qualities, as related to the present disclosure.

PV cells 302 in PV laminate 202 may be electrically connected to each other, for example, in series, parallel, or a combination of the two. Wiring for electrically connecting PV cells 216 within PV laminate 202 may be laminated between inner sheet 304 and outer sheet 306. Wiring may extend out from PV laminate 202 to electrical component housing 212 or be directly connected to a wiring harness or to other electricity distribution elements running along an underlying roof structure.

FIGS. 4A-4C show exemplary support arm 204. As shown, support arm 204 extends between first end 402 including a hinge portion 404, and second end 406 including latching tongue 408. The length of support 204 arm may substantially match the length of the PV laminate it is attached to, as shown in FIG. 2A, or the length of support 204 arm may be shorter than the length of the PV laminate it is attached to, as shown in FIG. 2C. Middle portion 410 of support arm 204 includes an upper surface 411 configured to be adhered to inner sheet 304 of PV laminate 202 and lower surface 413 configured to face an underlying roof structure. Middle portion 410 is substantially rectangular, and may have the dimensions of 110 mm by 195 mm.

Latching tongue 408 extends from middle portion 410 at second end 406 and may form a 90 angle with middle portion 410, however other angles are envisioned. Latching tongue 408 includes a latching window 414. In embodiments, latching window is rectangular, however other configurations are envisioned, including triangles, other polygons, circles, and other shapes. As will be discussed in detail below, latching window 414 is sized and shaped to receive a portion of a latching tab in order to mechanically couple latching tongue 414 into a latching slot of a mounting bracket of another PV module.

Hinge portion 404 of support arm 204 is located at the opposite end from latching tongue 408. Hinge portion 404 defines a pin cavity configured to receive a hinge pin. As shown, hinge portion 404 includes three knuckle portions 416. Knuckle portions 416 are configured to receive and mesh with knuckle portions of a mounting bracket, that also receive hinge pin and together form a hinge connection. The hinge connection allows for support arm 204 and mounting bracket 208 to be attached to each other while also allowing for a degree of freedom in the form of rotation.

In embodiments, support arm 204 is formed of sheet metal, for example aluminum or steel. Sheet metal provides the advantages of being lightweight, and easy to manufacture compared to casting, machining, etc. As shown in FIG. 4A, in embodiments, middle portion 410 may include support ribs 412 configured to provide strength and prevent bending of middle portion 410. Support arm 204 may be cut/stamped out of a flat piece of sheet metal, the cutout may include the general outline of support arm 204, latching window 414 and unformed hinge knuckle portions 416. The cutout may then be bent to form latching tongue 408 at the desired angle with middle portion 410, and hinge knuckle portions 416 may be rolled to define the pin cavity. In embodiments, middle portion 410 may include holes 418 to receive wire management clips, e.g. plastic clips including a nipple received in hole 418.

Figure 5A:
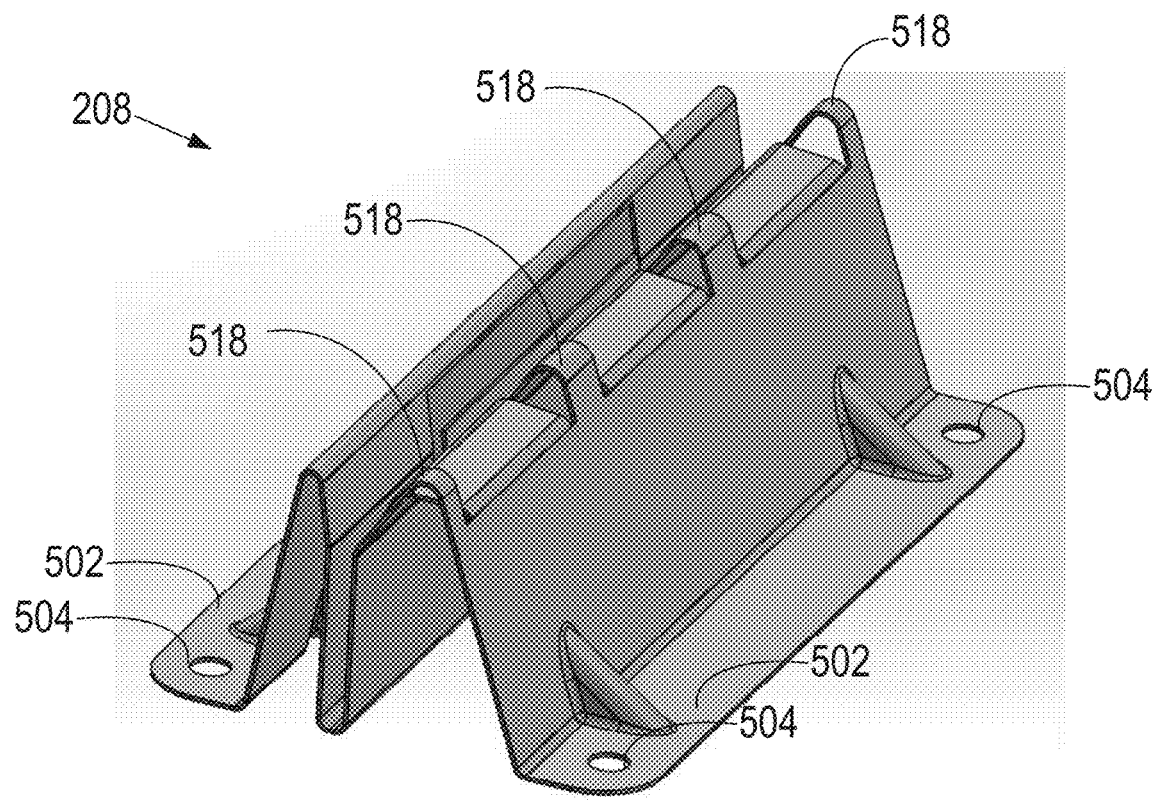
FIG. 5A shows a perspective view of a mounting bracket, in accordance with embodiments of the disclosure.
Figure 5B:
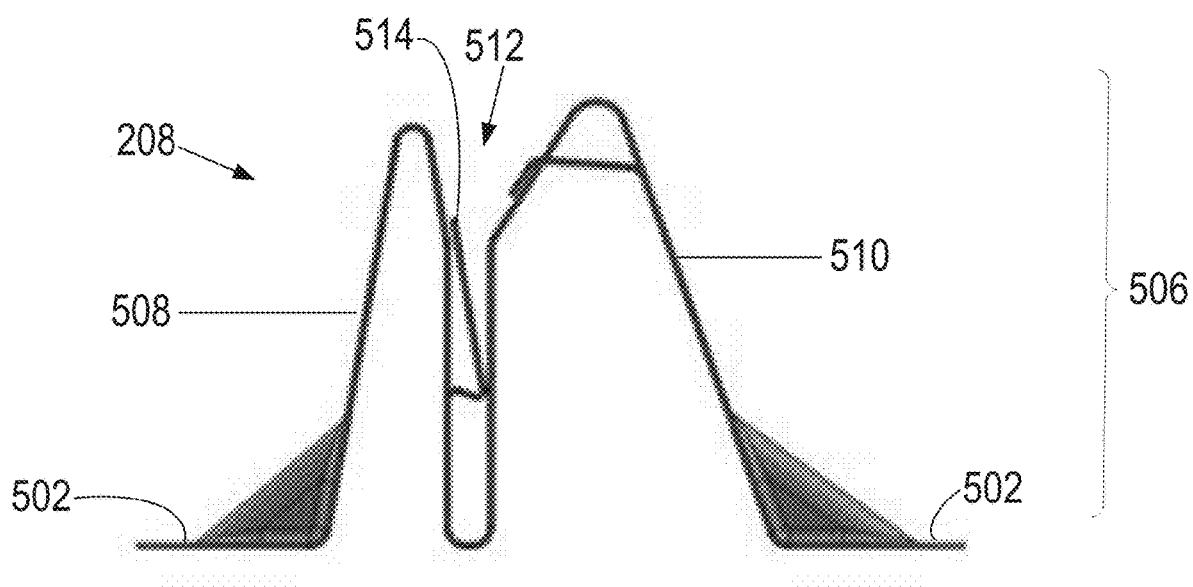
FIG. 5B shows a side view of the mounting bracket of FIG. 5A.
Figure 5C:
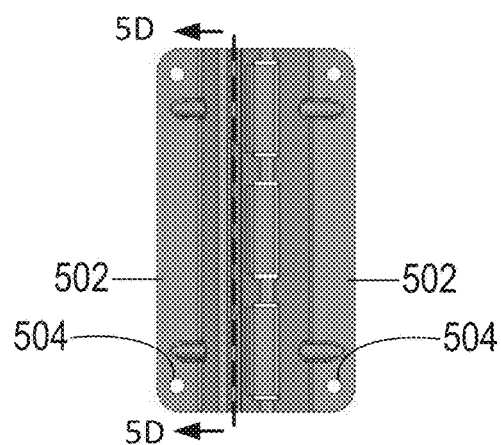
FIG. 5C shows a top view of the mounting bracket of FIG. 5A.
Figures 5D, 5E:
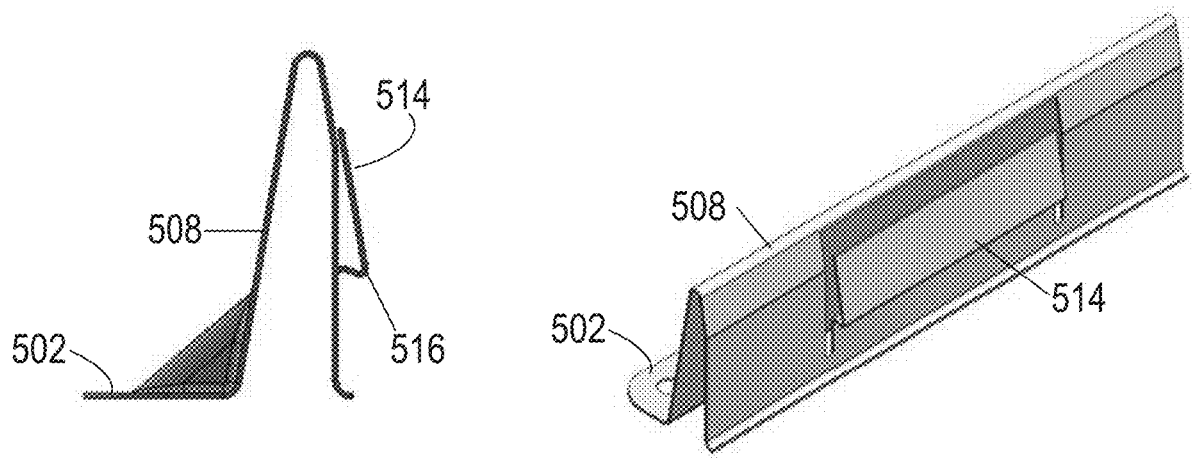
FIGS. 5D and 5E show cut-away views of the mounting bracket of FIG. 5A.

FIGS. 5A-5E shown an exemplary mounting bracket 208. Mounting bracket 208 includes one or more roof contact plates 502 configured to contact an underlying roof structure. Roof contact plates 502 provide a base for supporting PV modules of an array. Roof contact plates 502 may include mounting holes 504 for receiving fasteners (e.g. screws) to secure mounting bracket 208 to an underlying roof structure. Mounting bracket 208 may include an upper portion 506 extending away from roof contact plates 502. Upper portion includes first wedge portion 508 and second wedge portion 510. First wedge portion 508 and second wedge portion 510 are connected to each other and form a V-shaped latching slot 512. First wedge portion 508 includes latching tab 514 within latching slot 512 that extends toward second wedge portion 510. Latching tab 514 includes a latching block 516, as shown in cut-away views in FIGS. 5D and 5E. The cut-away views are taken along line 5D-5D of FIG. 5C. Latching tab 514 is sized and shaped to be received within a latching window of a support arm of another PV module, i.e. a PV module other than the PV module that the mounting bracket comprises. Latching tab 514 is plastically deformable from a first position located substantially within latching slot 512, as shown in FIG. 5B, to a second position away from second wedge portion 510 and substantially out of latching slot 512. Latching tab 514 may be spring biased to be positioned in the first position if not acted upon by an outside force. As will be discussed in more detail below, latching block 516 of latching tab 514 acts as a catch to form a mechanical coupling and secure a latching window of a support arm of another PV module to mounting bracket 208.

Second wedge portion 510 includes hinge knuckle portions 518 at the top portion. Hinge knuckles portions 518 are sized and spaced to mesh with hinge knuckles portion 416 of support arm 204. In embodiments, mounting bracket 208 may be configured to attach to two or more support arms 204. Mounting bracket 208 and support arm 204 are attached with pin 602 through knuckle portions 518 and knuckle portions 416 to form an axis of rotation, as shown in FIG. 6B. In embodiments, PV module 200 may include multiple mounting bracket 208 and support arm 204 assemblies, and each assembly is attached to PV laminate 202 so that the axes of rotation of each assembly is linearly aligned. Mounting bracket 208 may be formed of sheet metal, and as shown may be formed by bending a strip in a generally W shape to form first wedge portion 508 and second wedge portion 510.

Figure 6A:
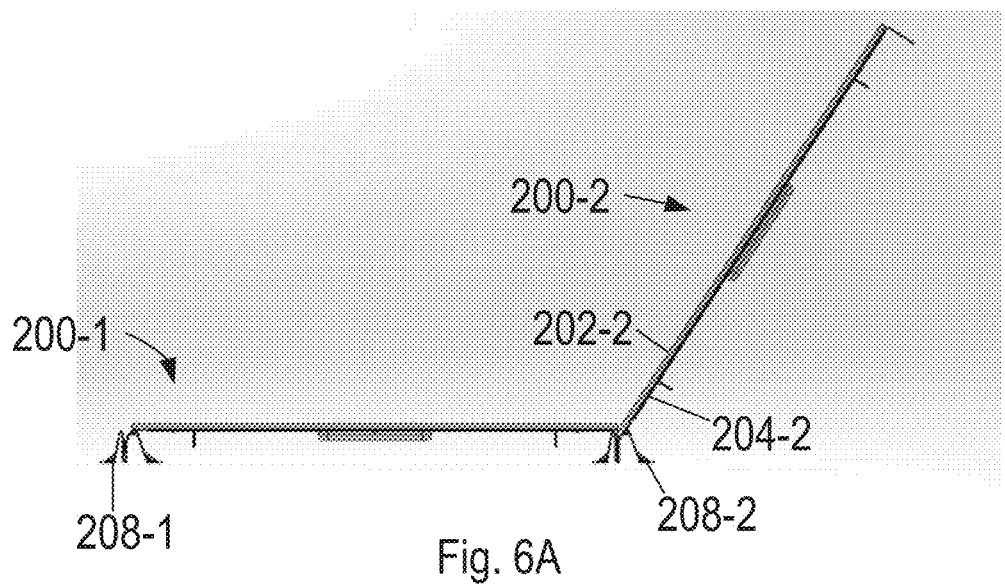
FIGS. 6A and 6B show views of two PV modules, in accordance with embodiments of the disclosure.
Figure 6B:
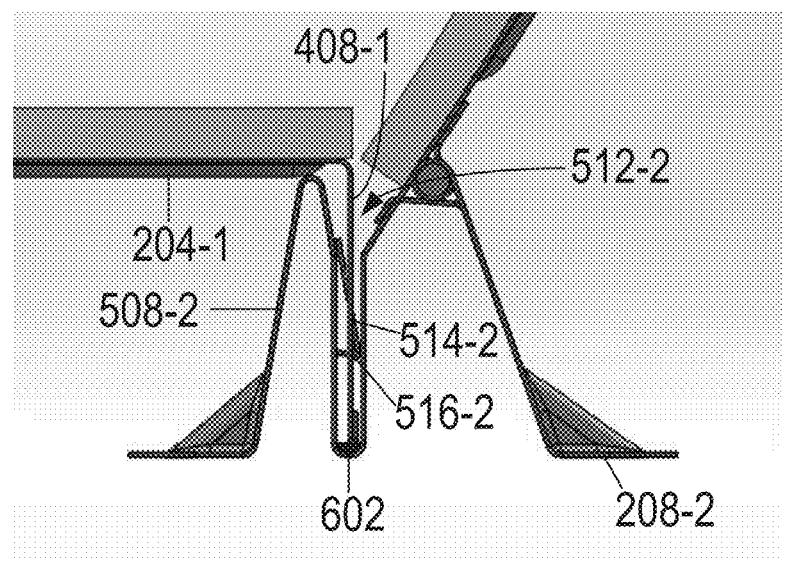

FIGS. 6A and 6B show two PV modules 200. First PV module 200-1 is positioned in a secured configuration where mounting bracket 208-1 is secured to an underlying roof structure, and latching tongue 408-1 of first PV module 200-1 is latched within latching slot 512-2 of mounting bracket 208-2 of second PV module 200-2. As shown in detail in FIG. 6B, in embodiments, support arm 204-1 of first PV module 200-1 may contact and be supported by the top of first wedge portion 508-2 of mounting bracket 208-2 of second PV module 200-2. When a mounting bracket of a PV module is secured to an underlying roof structure and the latching tongue is not latched within a mounting bracket of another PV module, the assembly of the support arm and PV laminate are free to rotate relative to the mounting bracket. For example, as shown in FIG. 6A support arm 204-2 and PV laminate 202-2 of second PV module 200-2 may be rotated away from an underlying roof structure to be in a propped up configuration. Positioning a PV module in a propped up configuration allows for access to the underlying roof structure, underlying electrical cabling, and/or an electrical component housing of the PV module.

When PV module is rotated from a propped up configuration to a secured configuration, latching tongue 408-1 of first PV module 200-1 is received in latching slot 512-2 of mounting bracket 208-2 of second PV module 200-2. As latching tongue 408-1 enters latching slot 512-2 latching tongue 408-1 contacts latching tab 514-2 of mounting bracket 208-2 and applies pressure countering the spring biasing force causing latching tab 514-2 to be pushed and bent away from second wedge portion of mounting bracket 208-2. As latching tongue 408-1 continues entering latching slot 512-2, latching block 516-2 aligns with latching window of latching tongue 408-1 causing latching tab 514-2 to snap back toward second wedge portion of mounting bracket 208-2 due to the spring biasing force. When latching block 516-2 is positioned within latching window of latching tongue 408-1, support arm 204-1 is latched to mounting bracket 208-2 and a mechanical coupling is formed. To undo the mechanical coupling a tool may be inserted into latching slot 512-2 to pry latching block 516-2 away from second wedge portion and out of mounting window of latching tongue 408-1, while support arm 204-1 is simultaneously pulled away from mounting bracket 208-2. Once unlatched, support arm 204-1 is free to rotate relative to mounting bracket 208-2 allowing access to the underlying roof structure. In embodiments, mounting brackets may include damping bumpers 602 secured at the bottom of latching slot 512, as shown in FIG. 6B. When latching tongue 408-1 is latched within latching slot 512-2, damping bumper 602 may prevent latching tongue 408-1 from moving (e.g. rattling) and becoming unlatched or causing excess wear to latching tongue 408-1 and mounting bracket 208-2.

FIGS. 7A-D show an example assembly procedure for forming a BIPV roof comprised of PV modules 200 as disclosed above. PV modules 200 are installed over the roof plane to form a watertight or substantially watertight envelope above underlying roof structure 700. PV modules 200 are arranged in vertical rows, referred to as vertical courses 702, along the slope of underlying roof structure 700. Before, during, or after PV modules are installed, additional roofing elements, including ridge flashing at the top of roof surface and eave flashing at the bottom of roof surface may be installed to form a complete roofing system.

Figure 7A:
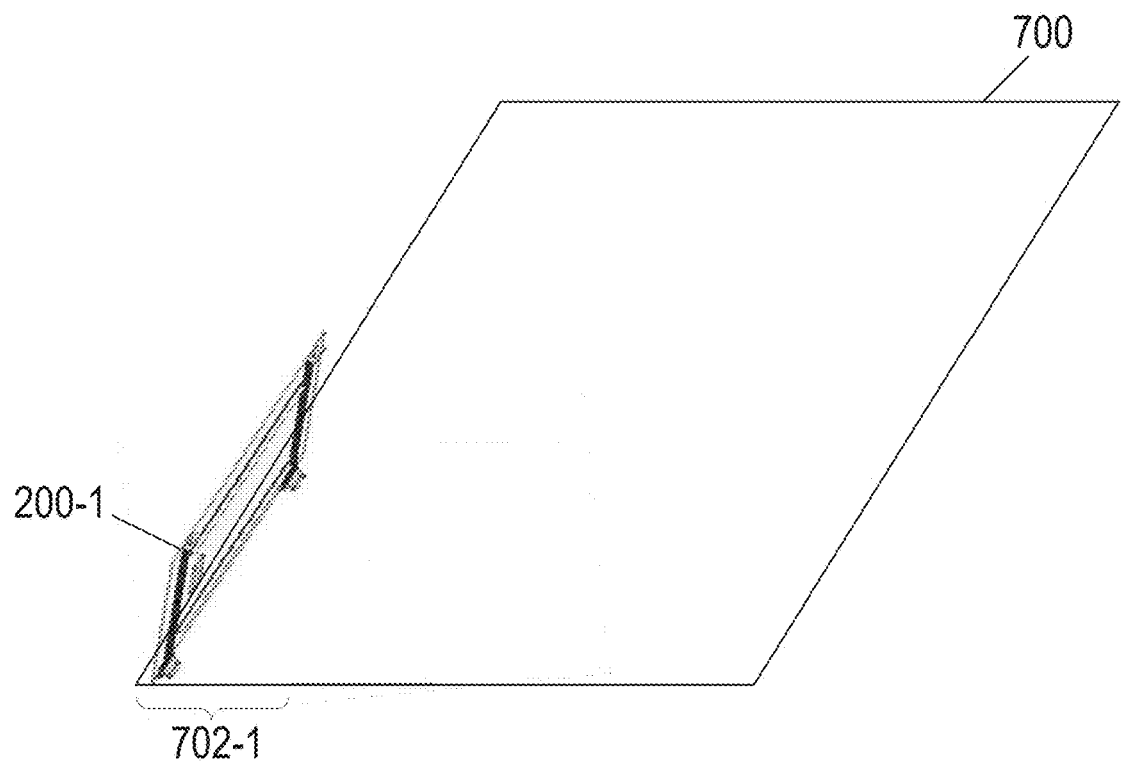
FIGS. 7A-D show exemplary steps for installing PV modules on an underlying roof structure, in accordance with embodiments of the disclosure.

FIG. 7A shows a step of forming a BIPV roof system comprising securing mounting brackets 208 of first PV module 200-1 with fasteners to start first vertical course 702-1 on underlying roof structure 700. After mounting bracket 208 of first PV module 200-1 of first course 702-1 is secured additional mounting brackets of PV modules of the same course can be secured adjacent to first PV tile 200-1 in order to extend first vertical course 702-1 up the slope of underlying roof structure 700. For simplicity of illustration, only one PV module is shown in each course in FIGS. 4A-4C, however a course may include any number of PV modules. As shown in FIG. 7A, once mounting brackets 208 of first PV module 200-1 of first course 702-1 are secured to underlying roof structure 700, first PV module 200-1 may be placed in a propped up configuration in order to not obstruct areas where mounting brackets of PV modules of second course 702-2 will be installed.

Figure 7B:
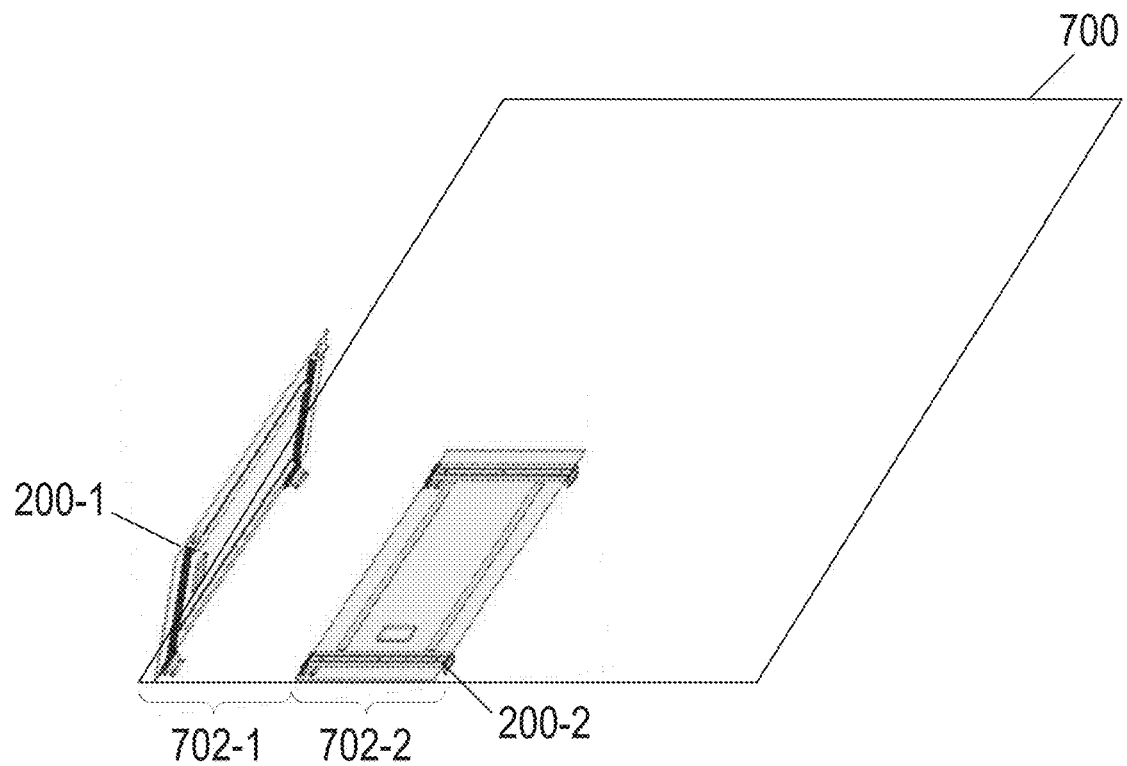
Figure 7C:
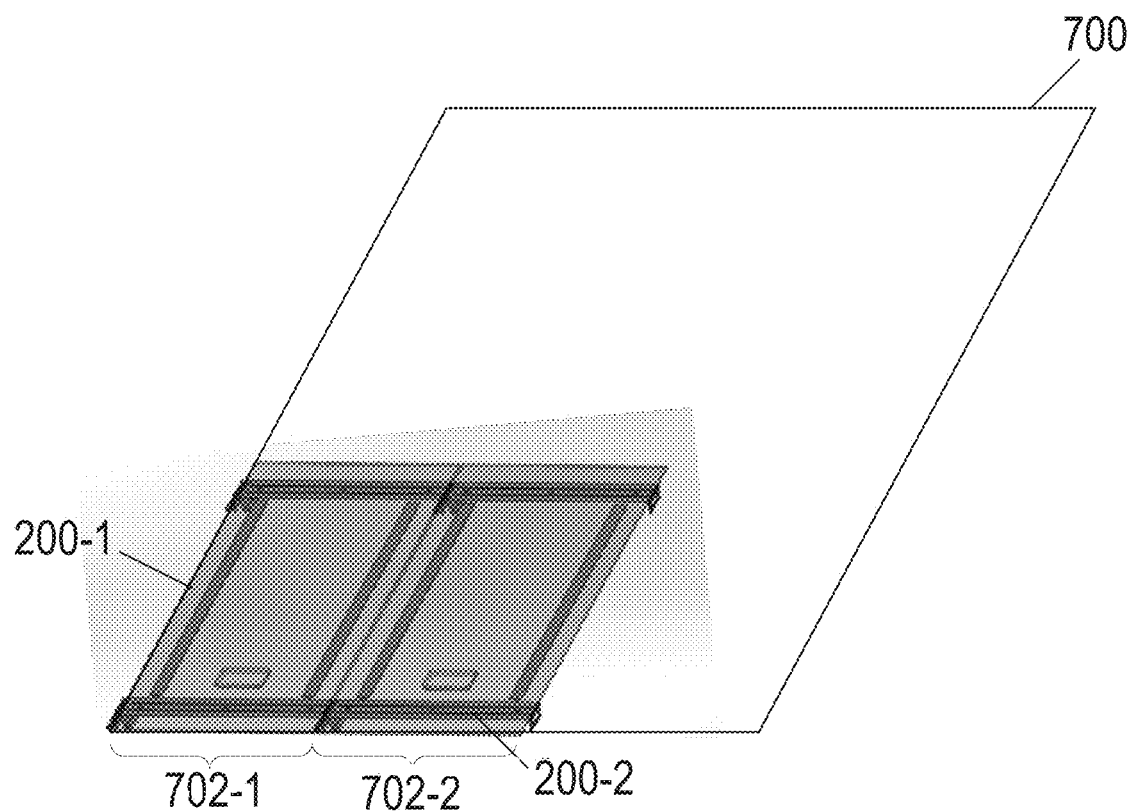
Figure 7D:
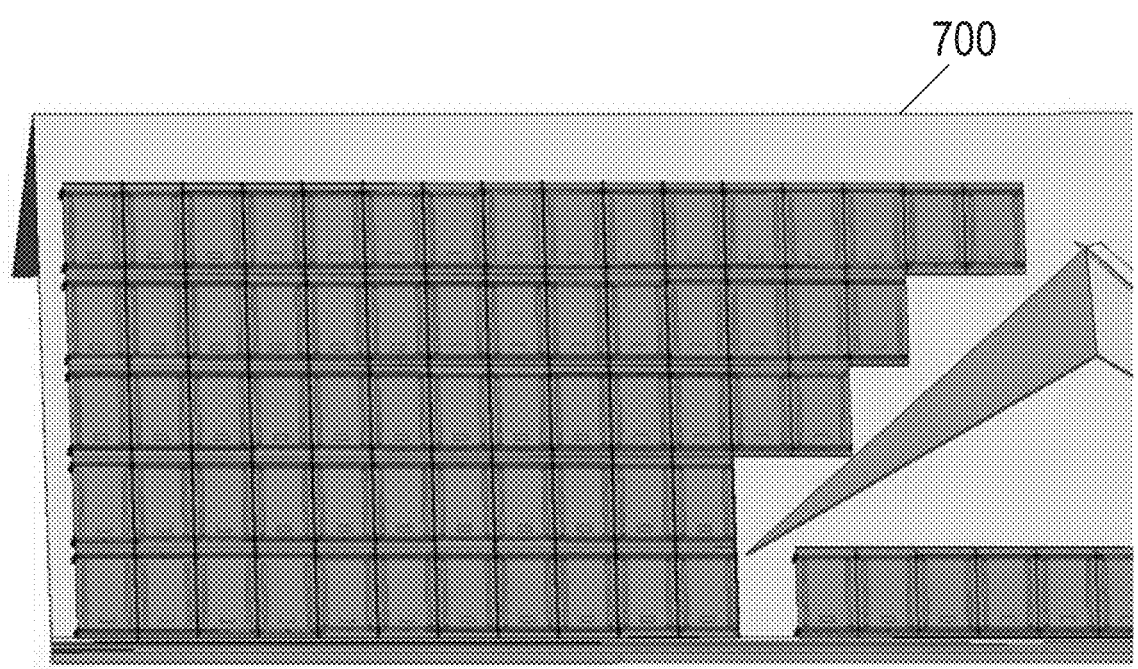

As shown in FIG. 7B, mounting brackets 208 of second course 702-2 are positioned and secured to underlying roof structure 700 so that latching tongues 408 of PV modules 200-1 of first course 702-1 will be received in latching slots 512 of mounting brackets 208 of second PV modules 200-2 of second course 702-2. With mounting brackets 208 of second PV modules 200-2 secured, first PV module 200-1 of first course 702-1 may be rotated toward a secured configuration so that latching tongues 408 of first PV module 200-1 are received and mechanically coupled in latching slots 512 of second PV module 200-2, as discussed above, and shown in FIG. 7C. This process is conducted for each PV module in each vertical course and for PV modules in additional courses in order to substantially cover underlying roof structure 700, as shown in FIG. 7D. In embodiments, mounting brackets 208 that are not part of a PV module may be used to secure a PV module when no additional PV modules are installed on the tongue side of the PV module. As shown in FIGS. 7A-D, PV modules are oriented with mounting brackets on the left and latching tongues on the right, however in embodiments installation may be done with other orientations, for example mountings brackets oriented on the right, on the top or on the bottom. In embodiments, with any mounting bracket orientation installation may be done from left to right, right to left, top to bottom, bottom to top, or any combination thereof. When adjacent PV modules are in the secured configuration the outer surfaces of PV laminates are on substantially the same plane and have the aesthetic quality of appearing to be a smooth substantially continuous surface.

Figure 8A:
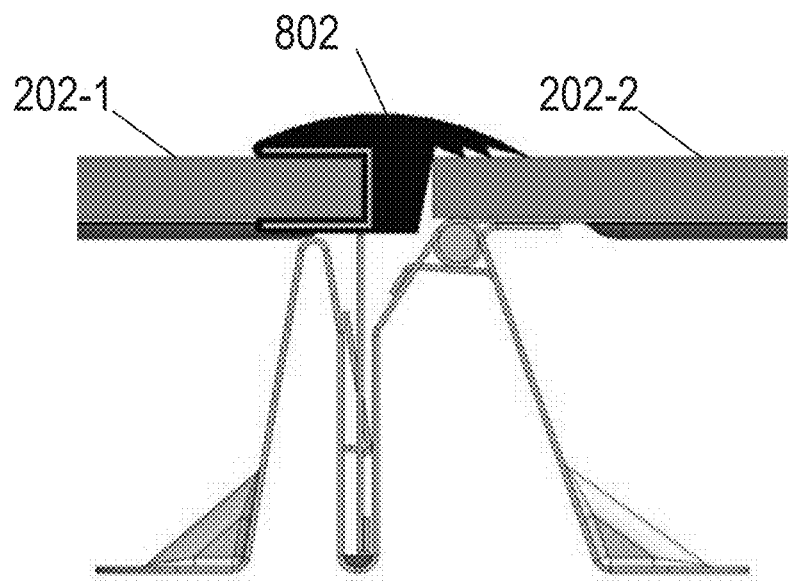
FIGS. 8A and 8B show exemplary sealing arrangements for adjacent PV modules, in accordance with embodiments of the disclosure.
Figure 8B:
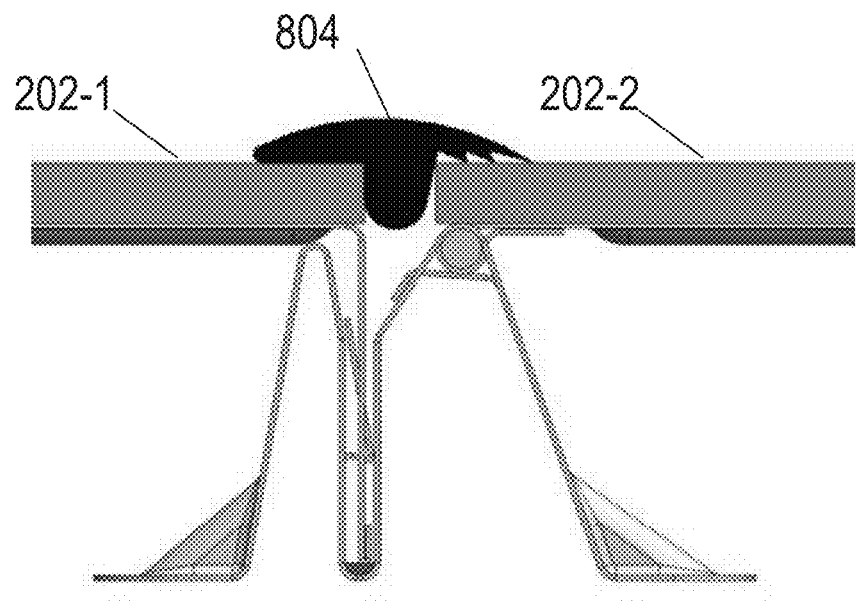

In embodiments, gaps between PV laminates of PV modules in the same course and adjacent courses may be present. In embodiments, sealing strips may be used to seal this gap and prevent water from seeping into the space between PV laminates and the underlying roof structure. For example, as shown in FIG. 8A, in embodiments sealing strip 802 may be placed around an edge of PV laminate 202-1 prior to placing PV modules in the secured confirmation. As shown, sealing strip 802 contacts a top surface of adjacent PV laminate 202-2 to form a seal. Further, in embodiments, sealing strip 804 may be placed in gap between adjacent PV laminates 202-1 and 202-2 after PV modules are installed in an array, as shown in FIG. 8B. Sealing strips 802 and 804 may be formed of a rubber or similar material, and may include an internal stiffener, e.g. metal strip, to provide rigidity and maintain shape.

Figure 9A:
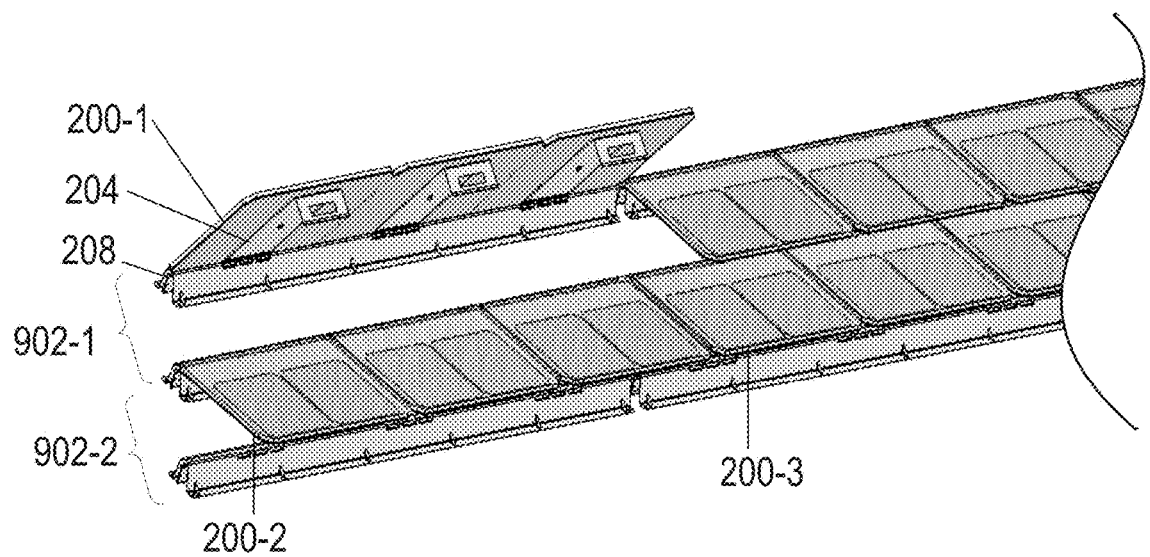
FIGS. 9A and 9B show various views of overlapping PV module arrays, in accordance with embodiments of the disclosure.
Figure 9B:
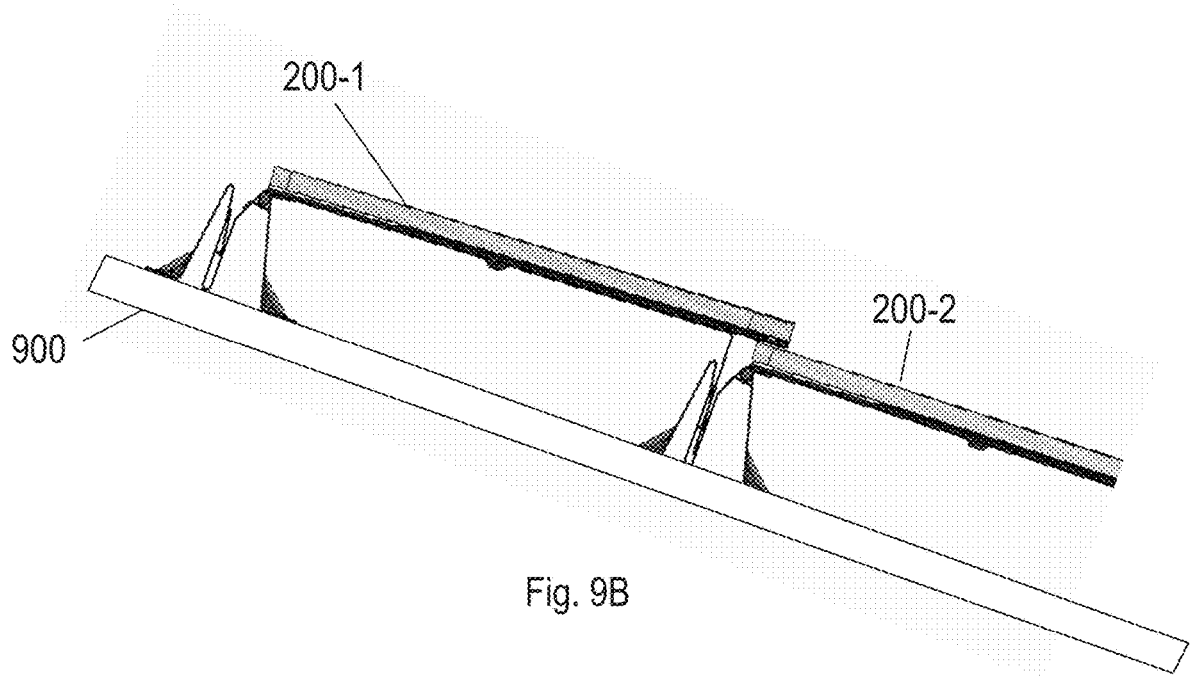

As noted above regarding FIGS. 2C-2E, in embodiments, PV modules may be installed on an underlying roof structure so that adjacent PV modules overlap, for example in a shingled configuration. FIGS. 9A and 9B show PV modules 201 in overlapping configurations. PV modules 201 may be installed in horizontal courses across an underlying roof structure. For example, first course 902-1 proximate to the ridge of an underlying roof structure may be installed by first securing mounting bracket 208 of first photovoltaic module 200-1 to the underlying roof structure with support arm 204 oriented in a down-roof direction. Next, the position of mounting brackets 208 of down-roof adjacent second course 902-2 is determined so that latching tongues of first photovoltaic module 200-1 of first course 902-1 can be received in latching slots of second photovoltaic module 200-2 of second course 902-2 and so that the down-roof end overlap portion of first photovoltaic module 200-1 of first course 902-1 will overlap the up-roof overlap portion of second photovoltaic module 200-2 of second course 902-2. With the PV arm assemblies of first course 902-1 propped up, mounting brackets of second course 902-2 are secured to the underlying roof structure. With second course 902-2 mounting brackets secured, PV arm assemblies of first course 902-1 may be rotated so that latching tongues are lowered into latching slots of second course 902-2 to secure and support a portion of first course 902-1 PV modules. FIG. 9B, shows a profile view of first PV module 200-1 of first course 902-1 attached to underlying roof structure 900 and overlapped with second PV module 200-2 of second course 902-2.

As shown in FIGS. 2C and 9A, PV modules 201 include three tile portions, however in embodiments PV modules 201 may include any number of tile portions, and PV modules in a course may have different numbers of tile portions. As shown in FIG. 9A, vertically adjacent courses of PV modules may be offset from each other by about half the width of a tile portion such that seams or breaks between two vertically adjacent rows of PV modules do not form a single seam or break along the full slope of roof surface, but rather form an alternating pattern of seams. In embodiments, a sealing strip is positioned between overlapping portions PV laminate of adjacent PV modules.

In embodiments, a BIPV array may include non-PV modules. For example, not every portion of a roof may be amenable to, or need to be used for, solar energy generation. Therefore, in addition to PV modules, for example as shown in FIGS. 2A and 2C, a roof surface may additionally include non-PV modules. Non-PV modules may have an identical or near identical appearance to PV modules and may be used on mounting planes that don't face South or that are shaded, or around vents, roof edges, roof eaves, and other obstacles or non-standard conditions. Non-PV modules may be manufactured in a similar manner as PV modules, as discussed above, and include a mounting bracket, support arms and a laminate that does not include PV cells. In embodiments non-PV modules may include mock PV cells, for example a patterned decal or silicon element that appears similar to a PV cell but is not electrically connected to the power distribution network, in order to provide a uniform appearance of a BIPV roof where PV and Non-PV portions are substantially indistinguishable. The mock PV cells may be laminated between the outer sheet and inner sheet.

As used herein, PV modules and non-PV modules may be referred to collectively as roof modules. During installation of a BIPV roof it may be advantageous to use a combination of different shapes and sizes of roof modules, for example to manages obstacles or complete courses. Unlike the example shown in FIGS. 7A-C, that include a rectangular roof section free of obstacles, a roof section may include obstacles, for example skylights, chimneys, vents dormer, hips and valleys. The obstacles may have shapes and distributions that do not correspond to the arrangement of courses and/or the standard size of roof modules as disclosed above. Roof modules may be formed various shapes configured to manage various different obstacles. For example, roof modules may be squares, rectangles, rhombuses, trapezoids, or triangles. In embodiments, some roof modules may be made of materials that facilitate trimming to precise shapes, for example transparent plastics, in order to accommodate obstacles with complex geometries and/or curves outlines.

In addition to completing courses, and managing obstacles, non-PV modules may be used when the use of a PV module is not economically efficient. For example, a roof may include portions that receive substantially different amounts of incident solar energy over the course of a day. In the Northern hemisphere a South-facing portion of a roof may receive substantially more solar energy than a North-facing portion. Further portions of a roof may be occluded from receiving sun light over the course of the day due to trees, other roof portions, or nearby buildings. The amount of energy PV modules received in these areas may not justify the costs of the PV modules. Therefore, these areas may be installed with non-PV modules, that allow for the entire roof to have a consistent appearance, without the added costs of inefficient PV module placements. Additionally, non-PV modules may also be used for example on non-occluded portions of a roof in cases where a desired power output is achieved with PV module on only a portion of the non-occluded roof.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples; alternative implementations may employ differing values or ranges, and can accommodate various increments and gradients of values within and at the boundaries of such ranges.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

The invention claimed is:

1. A photovoltaic module, comprising:
    a photovoltaic laminate having a first surface configured to face a roof structure and a second surface opposite the first surface;
    a support arm attached to and extending along the first surface from a first position proximate a first edge of the photovoltaic laminate, toward a second edge of the photovoltaic laminate and to a second position, wherein the support arm comprises:
        a first end located at the first position and comprising a first hinge portion and
        a second end comprising a tongue extending away from the first surface at the second position; and
    a mounting bracket, comprising a slot, and a second hinge portion mated with the first hinge portion to form a rotatable hinge connection between the mounting bracket and the support arm,
    wherein the mounting bracket is configured to be attach to the roof structure and allow the photovoltaic laminate and the support arm to rotate relative to the roof structure, and
    wherein the slot is configured to receive a tongue of a substantially identical photovoltaic module mounted to the roof structure adjacent to the photovoltaic module.

2. The photovoltaic module of claim 1, wherein the slot is configured to mechanically couple with a tongue of a substantially identical photovoltaic module.

3. The photovoltaic module of claim 1, wherein the tongue comprises a latching window and the at least one mounting bracket comprises a spring biased latching tab in the slot, and wherein the spring biased latching tab is configured to mechanically couple to a tongue of a substantially identical photovoltaic module by engaging a latching window of the substantially identical photovoltaic module.

4. The photovoltaic module of claim 1, wherein the mounting bracket is a first mounting bracket and the photovoltaic module further comprises a second mounting bracket, wherein the support arm is a first support arm and the photovoltaic module further comprises a second support arm extending along the first surface and being oriented so that the second support arm is substantially parallel to the first support arm; wherein the first mounting bracket and the first support arm define a first axis of rotation; wherein the second mounting bracket and the second support arm define a second axis of rotation; and where the first axis of rotation and the second axis of rotation are linearly aligned.

5. The photovoltaic module of claim 1, where the photovoltaic laminate comprises:
    a light transmissive outer sheet;
    an inner sheet; and
    at least one photovoltaic cell, encapsulated between the light transmissive outer sheet and the inner sheet,
    wherein the photovoltaic laminate does not include a frame around edges of the photovoltaic laminate.

6. The photovoltaic module of claim 5, further comprising an electrical component housing attached to the inner sheet;
    wherein the electrical component housing is configured to rotate with the photovoltaic laminate relative to the roof structure.

7. The photovoltaic module of claim 1, wherein the photovoltaic module comprises an overlap portion between an edge of the photovoltaic laminate opposite the at least one mounting bracket and the second end of the support arm, and wherein the overlap portion is configured to overlap a photovoltaic laminate of a substantially identical photovoltaic module positioned down-roof of the photovoltaic module.

8. The photovoltaic module of claim 7, wherein the photovoltaic laminate has the visual appearance of at least two distinct tiles.

9. The photovoltaic module of claim 1, wherein the at least one mounting bracket comprises a first mounting bracket, wherein the support arm is a first support arm and the photovoltaic module further comprises a second support arm; wherein the first support arm and second support arm are attached to the first mounting bracket; and wherein the slot of the first mounting bracket is configured to receive at least two tongues of one or more substantially identical photovoltaic modules mounted to the roof structure adjacent to the photovoltaic module.

10. A method of forming building integrated photovoltaic system, comprising:

securing a first mounting bracket of a first photovoltaic module to a roof structure, wherein the first photovoltaic module comprises:
a first photovoltaic laminate having a first surface facing the roof structure and a second surface opposite the first surface;
a first support arm attached to and extending along the first surface from a first position proximate a first edge of the first photovoltaic laminate, toward a second edge of the first photovoltaic laminate and to a second position, wherein the first support arm comprises:
a first end comprising a first hinge portion positioned at the first position, and
a second end comprising a first tongue extending away from the first surface of the first photovoltaic laminate at the second position,
wherein the first mounting bracket comprises a second hinge portion mated with the first hinge portion to form a rotatable hinge connection between the first mounting bracket, and wherein the first mounting bracket is configured allow the first photovoltaic laminate and the first support arm to rotate relative to the roof structure; and
securing a second mounting bracket of a second photovoltaic module to the roof structure, wherein the second mounting bracket comprises a second slot; and
with the first mounting bracket and the second mounting bracket secured to the roof structure, rotating the first support arm from a first position where the first tongue is not positioned within the second slot to a second position where the first tongue is positioned within the second slot.

11. The method of claim 10, wherein the first tongue engages the second slot to form a mechanical coupling when the first support arm is in the second position.

12. The method of claim 10, wherein the first tongue comprises a latching window and the second mounting bracket comprises a spring biased latching tab in the second slot, and wherein the spring biased latching tab engages the first tongue to form a mechanical coupling when the first support arm is in the second position.

13. The method of claim 10, wherein the first photovoltaic module further comprises a second support arm attached to the first photovoltaic laminate and comprising a second tongue, wherein when the first support arm is in the second position the second tongue is positioned within the second slot of the second mounting bracket or a third slot of a third mounting bracket of the second photovoltaic module.

14. The method of claim 10, further comprising:
securing a third mounting bracket of a third photovoltaic module to the roof structure; and
with the first mounting bracket, second mounting bracket, and third mounting bracket secured to the roof structure, rotating a third support arm of the third photovoltaic module to be received in the second slot.

15. The method of claim 10, wherein when the first support arm is received in the second slot a portion of the first photovoltaic laminate overlaps a portion of a second photovoltaic laminate.

16. The method of claim 15, further comprising:
securing a third mounting bracket of a third photovoltaic module to the roof structure; and
with the first mounting bracket, second mounting bracket, and third mounting bracket secured to the roof structure, rotating a third support arm of the third photovoltaic module to be received in the second slot, wherein when the third support arm is received in the second slot a portion of a third photovoltaic laminate overlaps a second portion of the second photovoltaic laminate.

17. A building integrated photovoltaic system, comprising:
a plurality of photovoltaic modules, comprising a first photovoltaic module and a second photovoltaic module, wherein each photovoltaic module comprises:
a photovoltaic laminate having a first surface facing an underlying roof structure and a second surface opposite the first surface, the photovoltaic laminate having a first edge and a second edge positioned opposite the first edge;
a support arm attached to and extending along the first surface from a first position proximate the first edge of the photovoltaic laminate, toward the second edge of the photovoltaic laminate and to a second position, wherein the support arm comprises:
a first end located at the first position and comprising a first hinge portion and
a second end comprising a tongue extending away from the first surface at the second position; and
a mounting bracket coupled directly to the underlying roof structure, the mounting bracket comprising a slot, and a second hinge portion mated with the first hinge portion to form a rotatable hinge connection between the mounting bracket and the support arm,
wherein the tongue of the first photovoltaic module is disposed within the slot of the second photovoltaic module.

18. The photovoltaic system of claim 17, wherein the slot of the mounting bracket of the second photovoltaic module comprises a spring biased latching tab, and the tongue of the support arm of the first photovoltaic module comprises a latching window, and wherein the tongue of the first photovoltaic module is mechanically coupled in the slot of the second photovoltaic module through engagement of the spring biased latching tab of the second photovoltaic module and the latching window of the first photovoltaic module.

19. The photovoltaic system of claim 17, wherein a portion of the photovoltaic laminate of the first photovoltaic module overlaps a portion of the photovoltaic laminate of the second photovoltaic module.

20. The photovoltaic system of claim 17, wherein the plurality of photovoltaic modules further comprises a third photovoltaic module, and wherein a tongue of the third photovoltaic module is mechanically coupled in the slot of the second photovoltaic module.

* * * * *